United States Patent [19]

Eisenberg

[11] 4,031,763
[45] June 28, 1977

[54] ADJUSTABLE STROKE LENGTH, RECIPROCATING TOOLS

[75] Inventor: Robert M. Eisenberg, Woodbine, Md.

[73] Assignee: The Singer Company, Binghamton, N.Y.

[22] Filed: Sept. 15, 1975

[21] Appl. No.: 613,631

[52] U.S. Cl. .................................................. 74/50
[51] Int. Cl.² ......................................... F16H 21/18
[58] Field of Search ................................... 74/50, 6

[56] References Cited

UNITED STATES PATENTS

| 2,307,174 | 1/1943 | Wachs | 74/50 |
| 2,839,935 | 6/1958 | Hartzell et al. | 74/6 |
| 2,960,879 | 11/1960 | Lafitte | 74/6 |

OTHER PUBLICATIONS

Strasser–Rotary–Linear Motion–Product Engineering, Mar. 9, 1959, p. 65.

Primary Examiner—Samuel Scott
Assistant Examiner—Wesley S. Ratliff, Jr.
Attorney, Agent, or Firm—Ronald Reichman; James C. Kesterson

[57] ABSTRACT

This invention is drawn to reciprocating power tools. It is often desirable in reciprocating power tools to be able to adjust the length of the stroke of the tool member. The invention disclosed herein comprises an inexpensive device for performing this function. In effect, a screw adjustment member having a hand knob is mounted in the tool housing and when rotated changes the position of one end of a simple lever. The other end of the lever bears against a rotating member which is mounted on the power output shaft of the tool. As this movable rotating member is adjusted, it causes a second simple lever to rotate, changing the position of the arm of the reciprocating mechanism with respect to the shaft of the power drive means. Thus, as the knob on the screw adjustment member is rotated, the swing arm length of the eccentric driven by the power source may be varied.

3 Claims, 1 Drawing Figure

U.S. Patent   June 28, 1977   4,031,763
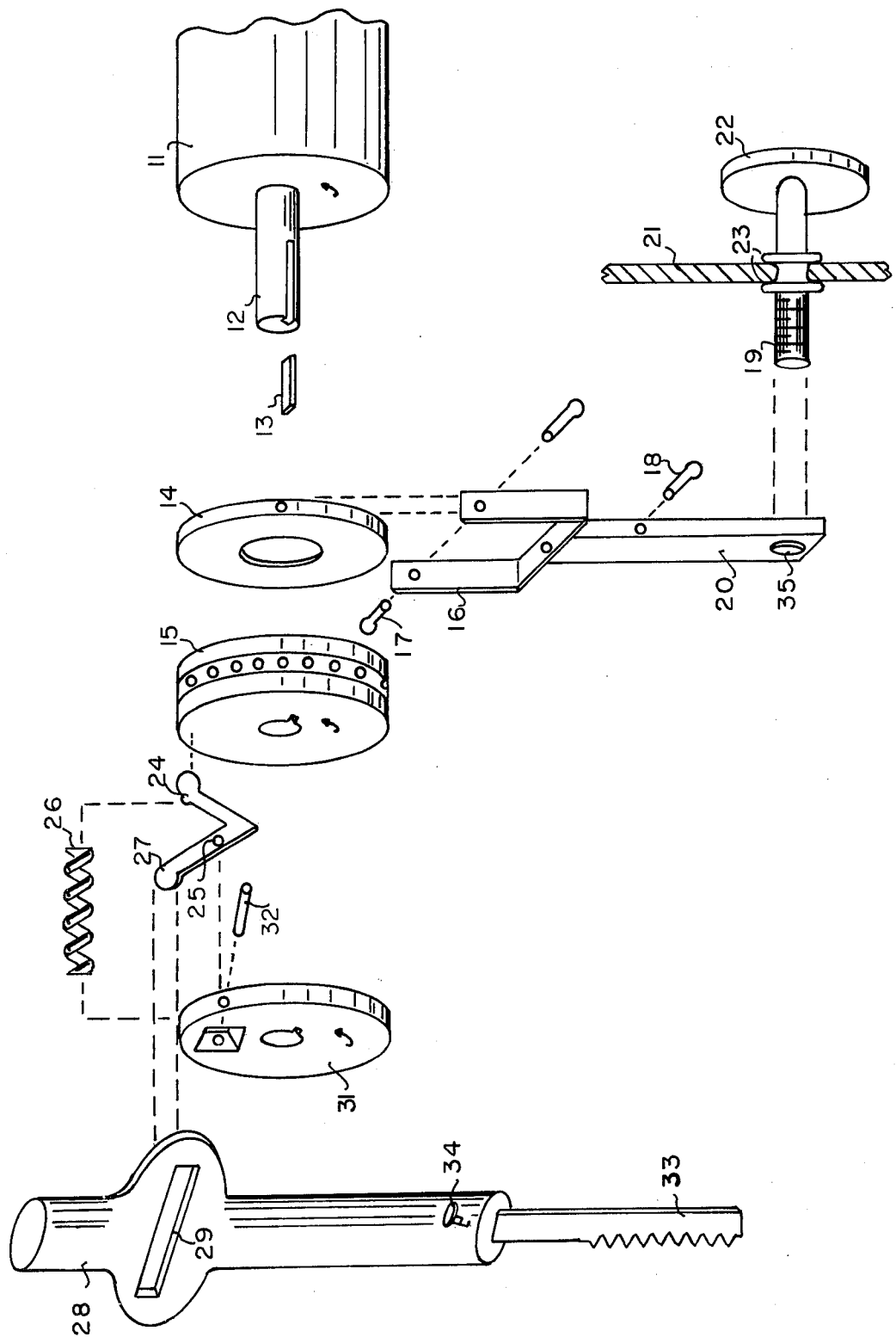

ADJUSTABLE STROKE LENGTH, RECIPROCATING TOOLS

BACKGROUND OF THE INVENTION

1. Field of the Invention

This invention relates to tools and, more particularly, to power tools having reciprocating tool members.

2. Description of the Prior Art

Many power tools used by both hobbyists and professional construction personnel use reciprocating members to accomplish their tasks. Such tools comprise, for example, saber and jig saws, power driven chisels, and the like. In general, at least one form of construction for these tools utilizes an eccentric for converting the rotary motion of the power source, which is generally an electric motor, into the desired reciprocating motion for the tool member. Such tools have customarily had a single length stroke.

SUMMARY OF THE INVENTION

This invention provides means for adjusting the stroke length of the tool member in reciprocating power tools.

It is an object of this invention to provide a new and improved reciprocating device.

It is another object of this invention to provide a new and improved reciprocating power tool.

It is a further object of this invention to provide a new and improved power tool having a reciprocating tool member with an adjustable length stroke.

It is still another object of this invention to provide a new and improved reciprocating power tool in which the reciprocating tool bit has a manually adjustable stroke length.

Other objects and advantages of this invention will become apparent as the following description proceeds, which description should be considered together with the accompanying drawing.

BRIEF DESCRIPTION OF THE DRAWING

The single FIGURE of the drawings is an exploded perspective view of a portion of a power saw which utilizes this invention.

DESCRIPTION OF A PREFERRED EMBODIMENT

Referring now to the drawing in detail, the reference character 11 refers to a gear box having an output shaft 12. The output shaft 12 has a keyway cut into it into which a key 13 fits. A pressure plate 14 fits over the shaft 12 and has a radial perforation therethrough. A fork 16 having holes at the ends of its tines fits over the pressure plate 14, and a pin 17 penetrates the holes in the tines of the fork 16 and the radial perforations of the pressure plate 14. The fork 16 is mounted at one end of a shaft 20 having a pivot 18 passed therethrough. The pivot 18 may be supported in the housing or on a frame member attached to the gear box 11, as desired. The other end of the shaft 20 has an internally threaded hole 35 cut through it, with a screw 19 having a pair of spaced rings 23 mounted on its shaft fitting inside of the threaded hole 35. The screw 19 penetrates the wall of the tool housing 21 with the housing 21 fitted between the spaced rings 23, and the shaft of the screw 19 external to the housing 21 has a hand knob 22 attached thereto. Mounted on the output shaft 12 of the gear box 11 is a thrust bearing 15 having a keyway cut therein to receive the key 13. A disc 31 also has a keyway cut therein to receive the key 13 and is mounted on the shaft 12. A portion of a lever 24 is passed through an opening in the disc 31. The lever 24 has a picot hole 25 formed therein, which hole 25 mates with similar holes in the disc 31, and a pivot pin 32 passes through the entire assembly. One end 27 of the lever 24 has a knob thereon which fits into the elongated opening 29 of a scotch yoke 28. A compression spring 26 has one end which bears against the scotch yoke 28 and another end which bears against the remote end of the lever 24. A saber saw blade 33 is inserted into the end of the scotch yoke 28 by means of any suitable device such as a thumb screw 34.

The gear box 11 is generally driven by an electric motor which has not been shown in the FIGURE in order to save description and drawing space. The output shaft 12 of the gear box 11 has a keyway cut in it which takes a key 13. The pressure plate 14 has an opening sufficiently large that it fits easily over the shaft 12 and the key 13 and is not required to rotate with the shaft 12. However, the thrust bearing 15 is so made that it slides over the shaft 12 and engages the key 13 in a keyway cut into its central opening. The thrust bearing 15 typically may comprise two flat discs separated by ball bearings. Thus, the two adjacent discs, the pressure plate 14 and the thrust bearing 15, do not operate the same. The fork 16 is pivotally attached to the pressure plate 14 by the pivot pins 17 passing through the openings in the ends of the fork 16 and the holes in the pressure plate 14. As mentioned above, the fork 16 is mounted at one end of a shaft 20 which is pivoted by means of a pivot pin 18 in the housing 21. The screw 19 is mounted through an opening in the wall of the housing 21 so that it is free to rotate, but the two rings 23 which are attached to the shaft of the screw 19 bear against the two sides of the housing 21 and prevent the screw from moving longitudinally in and out of the housing. Since the threaded end of the screw 19 passes into the internally threaded hole 35, any rotation of the knob 22 causes the bottom end of the shaft 20 to move longitudinally of the screw 19 and to pivot about the pivot pin 18. This moves the fork 16 in the opposite direction causing the pressure plate 14 to slide longitudinally along the shaft 12.

Since the lever 24 is attached to the disc 31 by means of the pivot pin 32, and since the disc 31 is driven by the shaft 12 through the key 13, the combination of the disc 31 and the lever 24 comprises an eccentric which helps convert the rotating motion of the shaft 12 into reciprocating motion. A knob 27 on the end of the lever 24 which fits into the slot 29 in the scotch yoke 28 drives the yoke 28 in a reciprocating manner to move the saw blade 33 so as to cut wood, metal, plastic, or whatever.

Generally speaking, as the shaft 12 rotates, it drives the thrust bearing 15 and the disc 31 in rotary motion. The knob 27 on the end of the lever 24 which is mounted on the disc 31 drives the scotch yoke up and down in a reciprocating manner a distance equal to twice the distance of the end of the knob 27 from the center of the shaft 12. As the hand knob 22 is rotated, it causes the bottom end of the shaft 20 to move. For this discussion, assume that the bottom end of the shaft 20 moves toward the right. This drives the fork 16 and the pressure plate 14 to the left, forcing the thrust bearing 15 also to the left. As the thrust bearing 15 moves toward the left, the end of the lever 24 which bears against the thrust bearing 15 is also moved toward the left against the action of the spring 26. The lever 24 pivots about the pivot pin 32 causing the knob 27 to move downwardly (as shown) and toward the left. This moves the knob 27 closer to the shaft 12 decreasing the length of the stroke of the scotch yoke 28 and of the saw blade 33. When the knob 22 is rotated in the other direction, the pressure plate 14 and the thrust bearing 15 move toward the right, and the spring 26 forces the remote end of the lever 24 toward the right increasing the length of the stroke of the scotch yoke 28. As an alternative, the lever 24 could be pivoted in a slot in the shaft 12 and devices other than the thrust bearing 15 could be used to move the lever 24.

The mechanism shown in the single FIGURE of the drawings is but one form the mechanism can take, for example, a lever arrangement inserted into a slot in the housing and pivoted in the housing which causes a change in the length of the stroke directly under the operation of a finger could be used. There are other mechanisms which can be devised to perform similar operations, but most of these mechanisms are the full equivalent of that disclosed herein and it is intended that this invention be limited only by the scope of the appended claims.

I claim:

1. In a reciprocating power tool, mechanism for modifying the length of the stroke of the tool, said mechanism comprising:
   a. a housing;
   b. a power source having a rotating shaft, said source being mounted in said housing;
   c. means for converting the rotating motion of said shaft to reciprocating motion, said means comprising at least a lever member having an offset from said rotating shaft and a part mounted in said housing for reciprocal movement and driven by said member; and
   d. means for changing the distance of said offset from the center line of said shaft, said changing means comprising a first pressure device slidably supported on said shaft and longitudinally movable along said shaft to bear against one end of said lever member whereby the position of the other end of said lever member is modified.

2. The mechanism defined in claim 1 wherein said means for changing said offset comprises said first pressure device bearing against one end of said lever in a first direction to change the position of said lever and further including a second pressure device for moving said lever in a second direction.

3. The mechanism defined in claim 2 further including means for causing said first pressure device to move in response to an adjustment external of said housing.

* * * * *